United States Patent
Byun et al.

(10) Patent No.: US 9,825,277 B2
(45) Date of Patent: Nov. 21, 2017

(54) RECHARGEABLE BATTERY

(71) Applicant: SAMSUNG SDI CO., LTD., Yongin-si, Gyeonggi-do (KR)

(72) Inventors: Sang-Won Byun, Yongin-si (KR); Won-Jun Lee, Yongin-si (KR); Hong-Hyeon Lee, Yongin-si (KR); Jae-Kyung Kim, Yongin-si (KR); In Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 76 days.

(21) Appl. No.: 14/728,942

(22) Filed: Jun. 2, 2015

(65) Prior Publication Data

US 2016/0093867 A1 Mar. 31, 2016

(30) Foreign Application Priority Data

Sep. 29, 2014 (KR) ........................ 10-2014-0130394

(51) Int. Cl.
*H01M 2/34* (2006.01)
*H01M 2/26* (2006.01)
(Continued)

(52) U.S. Cl.
CPC ........... *H01M 2/34* (2013.01); *H01M 2/0285* (2013.01); *H01M 2/043* (2013.01);
(Continued)

(58) Field of Classification Search
CPC .... H01M 2/04; H01M 2/0456–2/0495; H01M 2/06; H01M 2/08; H01M 2/20;
(Continued)

(56) References Cited

U.S. PATENT DOCUMENTS

| 6,287,718 B1 * | 9/2001 | Azema ..................... H01H 3/00 200/61.08 |
| 2011/0177387 A1 * | 7/2011 | Byun ...................... H01M 2/04 429/178 |

(Continued)

FOREIGN PATENT DOCUMENTS

| CN | 202839773 | * | 3/2013 | ............. H01M 2/04 |
| EP | 2 461 393 A1 | | 6/2012 | |

(Continued)

OTHER PUBLICATIONS

Machine translation of Cai et al. CN 202839773 (Mar. 2013).*

(Continued)

*Primary Examiner* — Jonathan Crepeau
*Assistant Examiner* — Jacob Buchanan
(74) *Attorney, Agent, or Firm* — Lewis Roca Rothgerber Christie LLP (57) ABSTRACT

A rechargeable battery includes a case; an electrode assembly accommodating the case; a cap plate sealing an opening of the case; terminals electrically coupled to the electrode assembly and penetrating the cap plate; terminal plates on the cap plate and coupled to a respective one of the terminals; and a connecting member including a sinuous body located between the cap plate and the terminal plate to electrically couple the cap plate and the terminal plate.

8 Claims, 8 Drawing Sheets

(51) Int. Cl.
*H01M 2/02* (2006.01)
*H01M 2/04* (2006.01)
*H01M 2/30* (2006.01)

(52) U.S. Cl.
CPC ............ *H01M 2/0486* (2013.01); *H01M 2/26* (2013.01); *H01M 2/30* (2013.01); *H01M 2/348* (2013.01); *H01M 2200/00* (2013.01); *H01M 2200/103* (2013.01); *H01M 2220/20* (2013.01)

(58) Field of Classification Search
CPC ............ H01M 2/22–2/26; H01M 2/30; H01M 2/305–2/307; H01M 2/34; H01M 2/348
See application file for complete search history.

(56) References Cited

U.S. PATENT DOCUMENTS

| | | | |
|---|---|---|---|
| 2011/0256433 A1* | 10/2011 | Fuhr | H01M 2/1229 429/82 |
| 2012/0107651 A1 | 5/2012 | Hotta et al. | |
| 2013/0029189 A1* | 1/2013 | Kim | H01M 2/30 429/61 |
| 2015/0099163 A1* | 4/2015 | Kim | H01M 2/0473 429/178 |

FOREIGN PATENT DOCUMENTS

| | | |
|---|---|---|
| EP | 2 551 938 A1 | 1/2013 |
| EP | 2 660 896 A1 | 11/2013 |
| EP | 2 757 614 A1 | 7/2014 |
| EP | 2 860 786 A1 | 4/2015 |
| JP | 2005-108583 A | 4/2005 |
| JP | 2007-250301 A | 9/2007 |
| JP | 2012-99307 A | 5/2012 |
| KP | 10-2013-0124719 A | 11/2013 |
| KR | 10-2013-0040576 A | 4/2013 |

OTHER PUBLICATIONS

Patent Abstracts of Japan and Machine English Translation of JP 2005-108583 A, Apr. 21, 2005, 20 Pages.
Patent Abstracts of Japan and Machine English Translation of JP 2007-250301 A, Sep. 27, 2007, 14 Pages.
EPO Search Report dated Feb. 4, 2016, for corresponding European Patent application 15178663.9, (7 pages).

* cited by examiner

RECHARGEABLE BATTERY

CROSS-REFERENCE TO RELATED APPLICATION

This application claims priority to and the benefit of Korean Patent Application No. 10-2014-0130394 filed in the Korean Intellectual Property Office on Sep. 29, 2014, the entire contents of which are incorporated herein by reference.

BACKGROUND

1. Field

The present invention relates to a rechargeable battery.

2. Description of the Related Art

A rechargeable battery differs from a primary battery in that it can be repeatedly charged and discharged, while the latter is incapable of being recharged.

A low-capacity rechargeable battery is used in small portable electronic devices such as mobile phones, notebook computers, and camcorders, while a high-capacity rechargeable battery is widely used as a power source for driving a motor of a hybrid vehicle or a large-capacity power storage device.

Recently, a high power rechargeable battery using a non-aqueous electrolyte and having high energy density has been developed, and the high power rechargeable battery is formed as a large-capacity battery module in which a plurality of rechargeable batteries are connected in series, such that it can be used as a power source for driving a motor of a device requiring a large amount of electric power, for example, an electric vehicle or the like.

Such a rechargeable battery has a case that may be formed to have a cylindrical shape, a prismatic shape, etc.

When a conductive material (e.g., a conductive nail) or the like penetrates the case and enters an electrode assembly, a negative electrode and a positive electrode forming the electrode assembly can be short-circuited.

In this case, a temperature of the electrode assembly increases due to a short-circuit current generated inside the rechargeable battery, thereby potentially causing ignition or explosion of the electrode assembly.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a rechargeable battery including a structure for preventing ignition or explosion of a rechargeable battery due to a short-circuit current generated by a short-circuit.

A rechargeable battery according to an exemplary embodiment of the present invention includes: a case; an electrode assembly for accommodating the case; a cap plate for sealing an opening of the case; terminals electrically coupled to the electrode assembly and installed to penetrate the cap plate; terminal plates installed on the cap plate to be coupled to the terminals; and a connecting member including a sinuous body installed between the cap plate and the terminal plate to electrically couple the cap plate and the terminal plate.

The sinuous body may include a first connector that is installed to face the terminal plate to be electrically coupled to the terminal plate, a second connector that is installed to face the cap plate to be electrically coupled to the cap plate, and a bent portion that connects the first connector and the second connector.

The bent portion of the sinuous body may be covered with an insulating coating layer.

The bent portion of the sinuous body may be spiral-shaped.

The first connector may include a first protrusion that protrudes from one side facing the terminal plate, and the second connector may include a second protrusion that is disposed opposite to the one side to protrude from the other side facing the cap plate.

One side on which the first protrusion of the bent portion is formed may be covered with a first insulating coating layer that has a smaller thickness than a height of the first protrusion, and the other side on which the second protrusion of the bent portion is formed may be covered with a second insulating coating layer that has a smaller thickness than a height of the second protrusion.

The sinuous body of the connecting member may include a through-hole through which the terminal penetrates.

The rechargeable battery may further include a current collecting member electrically coupling the terminal and the electrode assembly and including a fuse portion.

According to exemplary embodiments of the present invention, the short-circuit current generated by the short-circuit can be dissipated outside of the electrode assembly, thereby preventing ignition or explosion of the rechargeable battery due to the short-circuit current.

DETAILED DESCRIPTION

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In the drawings, the dimensions of layers or regions may be exaggerated for clarity of description.

It will be understood that when a layer or element is referred to as being "on" another layer or substrate, it may be directly on the other layer or element or intervening layers or elements may be present.

In addition, it will be understood that when a layer is referred to as being "under" another layer, it may be directly under the other layer or one or more intervening layers may be present.

Moreover, it will be understood that when a layer is referred to as being "between" two layers, there may be only one layer between the two layers or one or more intervening layers may be present.

In the present specification and the drawings, like reference numerals designate like elements throughout the specification.

Figure 1:
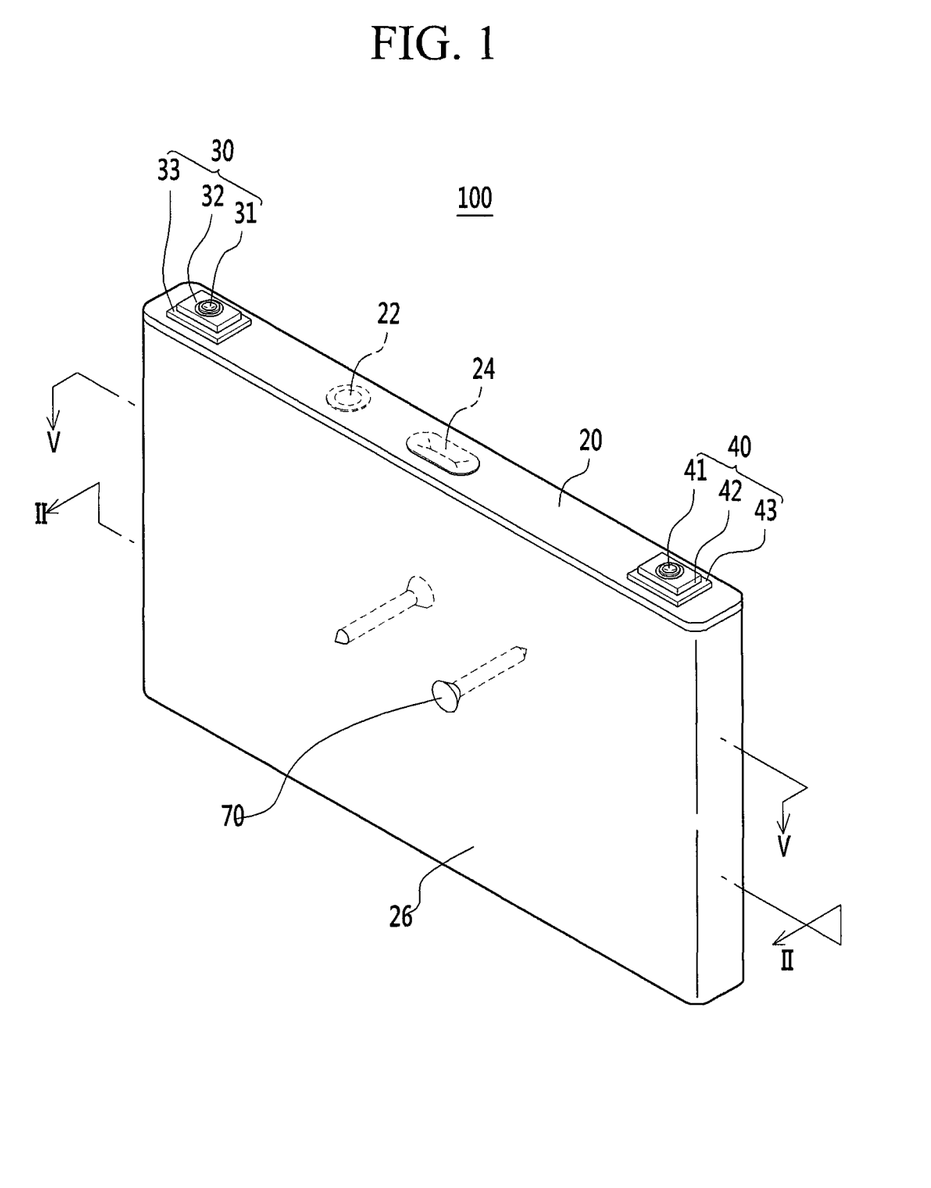
FIG. 1 is a perspective view of a rechargeable battery according to a first exemplary embodiment of the present invention penetrated by a conductive material.
Figure 2:
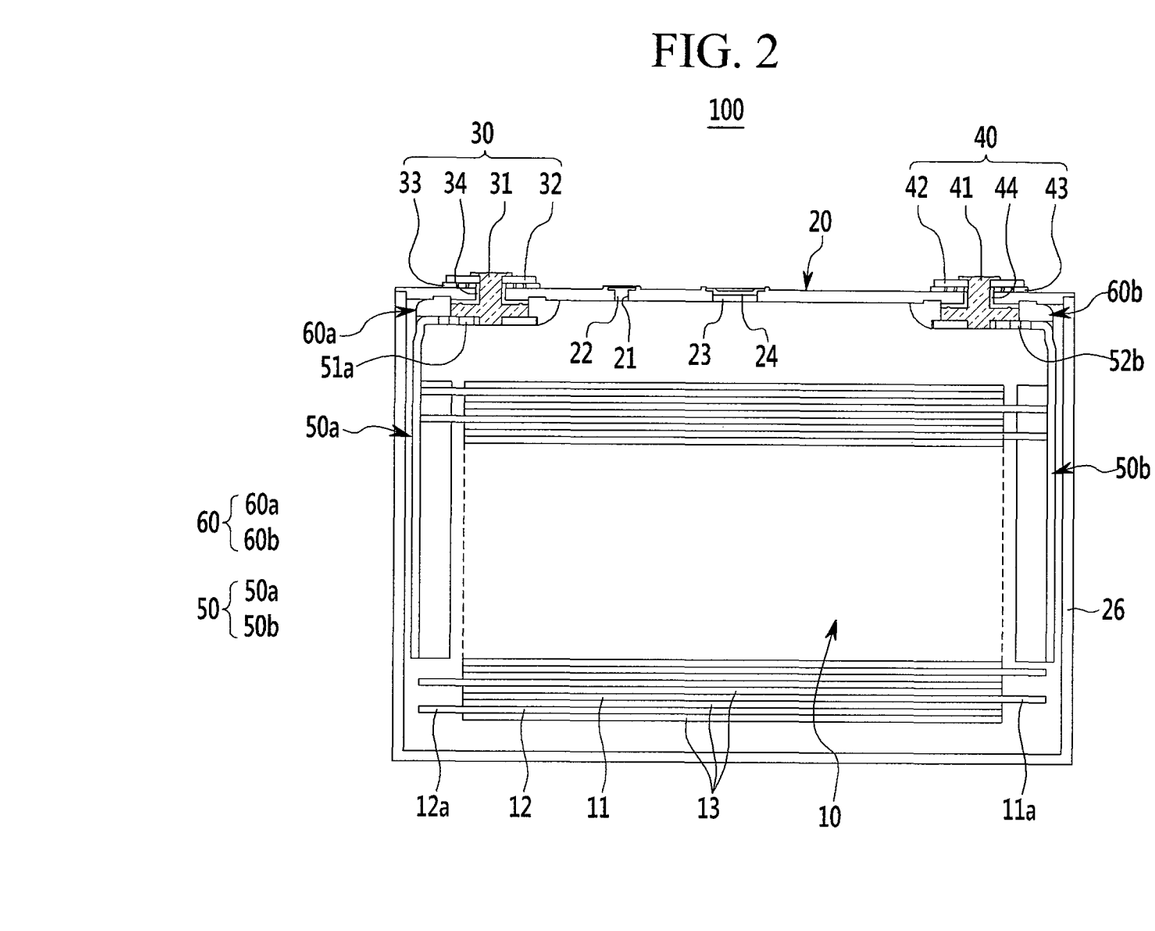
FIG. 2 is a cross-sectional view of FIG. 1 taken along the line II-II.

FIG. 1 is a perspective view of a rechargeable battery according to a first exemplary embodiment of the present invention penetrated by a conductive material, and FIG. 2 is a cross-sectional view of FIG. 1 taken along the line II-II.

Referring to FIGS. 1 and 2, the rechargeable battery 100 according to the present exemplary embodiment includes: an electrode assembly 10; a cap plate 20; a case 26; terminal portions 30 and 40 including a first terminal portion 30 and a second terminal portion 40; a current collecting member 50 including a first current collecting member 50a including a fuse portion 51a and a second current collecting member 50b; and a lower insulating member 60 including first and second lower insulating members 60a and 60b.

The electrode assembly 10 according to the present exemplary embodiment may be formed in a jelly-roll shape by spirally winding a first electrode 11, a second electrode 12, and a separator 13 therebetween.

In this case, the first electrode 11 may be a negative electrode and the second electrode 12 may be a positive electrode.

In addition, the first and second electrodes 11 and 12 may respectively include a current collector formed of a thin metal foil, and an active material that is coated on a surface of each current collector.

Specifically, the first and second electrodes 11 and 12 may be divided into coated regions where the active material is coated on the current collector, and a first electrode uncoated region 11a and a second electrode uncoated region 12a that are respectively located at opposite ends of the coated regions and where the active material is not coated on the current collector.

However, the electrode assembly 10 according to the present exemplary embodiment is not limited to the jelly-roll shape, and it may have a structure in which the first and second electrodes 11 and 12 formed by a plurality of sheets are layered while interposing the separator 13 therebetween.

An opening may be formed in the case 26 according to the present exemplary embodiment, and the electrode assembly 10 inserted into the opening may be accommodated inside the case 26.

The cap plate 20 according to the present exemplary embodiment is combined to the opening of the case 26 to seal the case 26.

In addition, the cap plate 20 may include: an electrolyte injection opening 21; a sealing cap 22 for sealing the electrolyte injection opening 21; a vent plate 24 configured to be ruptured when internal pressure of the case 26 exceeds a predetermined pressure; and a vent hole 23 in which the vent plate 24 is installed.

The terminal portions 30 and 40 according to the present exemplary embodiment include terminals 31 and 41, terminal plates 32 and 42, a connecting member 33 or terminal insulating member 43, and gaskets 34 and 44.

Specifically, the first terminal portion 30 of the terminal portions 30 and 40 may include a first terminal 31, a first terminal plate 32, the connecting member 33, and a first gasket 34.

The first terminal 31 is installed to penetrate the cap plate 20 while being electrically coupled to the second electrode 12 of the electrode assembly 10 through the first current collecting member 50a.

The first terminal plate 32 is combined to the first terminal 31 to be electrically coupled to the second electrode 12 of the electrode assembly 10 through the first terminal 31.

The connecting member 33 is installed between the first terminal 31 and the cap plate 20, and includes a sinuous body 33a that electrically couples the first terminal plate 32 and the cap plate 20.

The first gasket 34 is installed between the first terminal 31 and the cap plate 20 to electrically insulate between the first terminal 31 and the cap plate 20.

The second terminal portion 40 of the terminal portions 30 and 40 may include a second terminal 41, a second terminal plate 42, a second terminal insulating member 43, and a second gasket 44.

The second terminal portion 40 has the same structure as the first terminal portion 30 except for the second terminal insulating member 43.

In one embodiment, the second terminal insulating member 43 according to the present exemplary embodiment is installed between the second terminal plate 42 and the cap plate 20 to electrically insulate the second terminal plate 42 from the cap plate 20.

Thus, according to the present exemplary embodiment, the cap plate 20 may be electrically coupled to the second electrode 12 through the connecting member 33, and the case 26 may be electrically coupled to the second electrode 12 through the cap plate 20.

The connecting member 33 according to the present exemplary embodiment will now be described in detail.

Figure 3:
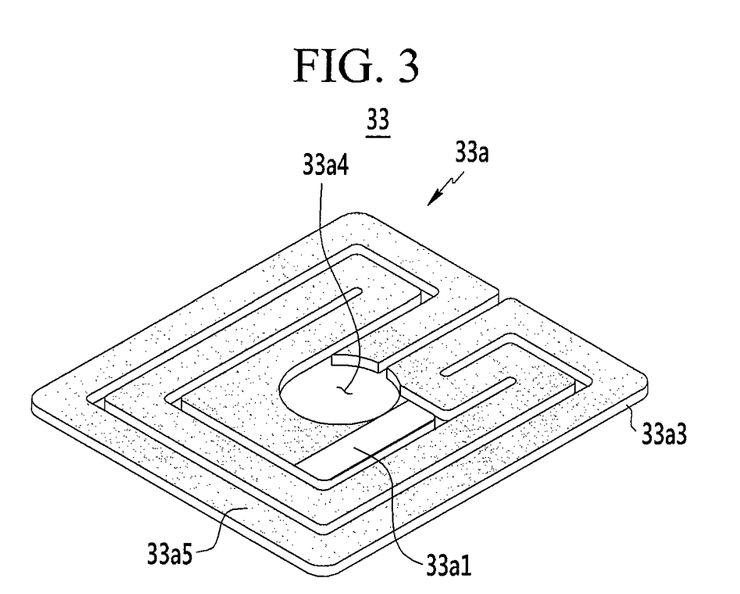
FIG. 3 is a perspective view of a connecting member of the rechargeable battery of FIG. 1.
Figure 4A:
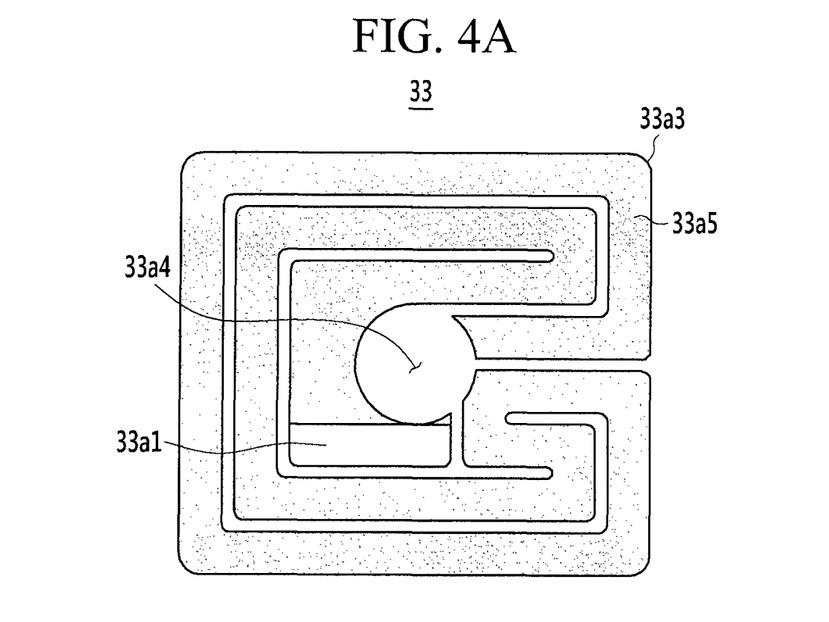
FIG. 4A is a top plan view of the connecting member of FIG. 3.
Figure 4B:
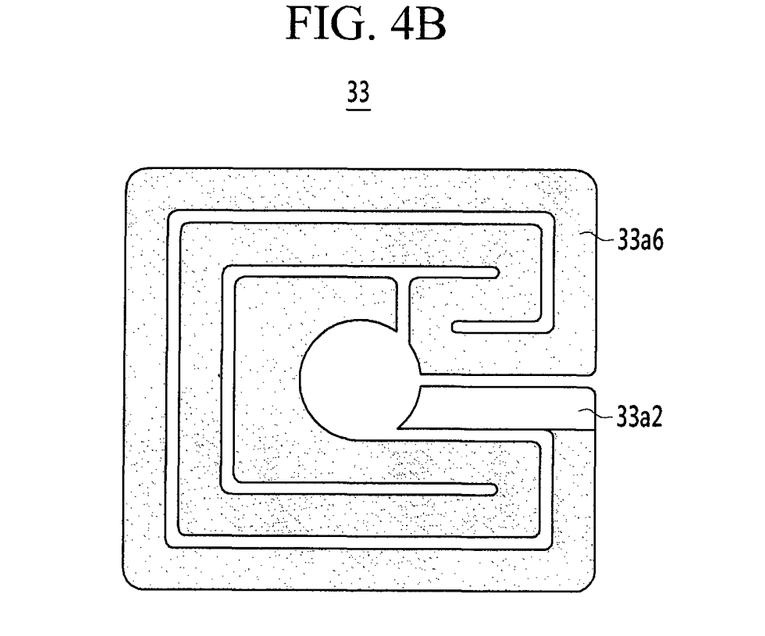
FIG. 4B is a bottom view of the connecting member of FIG. 3.

FIG. 3 is a perspective view of a connecting member of the rechargeable battery of FIG. 1, FIG. 4A is a top plan view of the connecting member of FIG. 3, and FIG. 4B is a bottom view of the connecting member of FIG. 3.

Referring to FIGS. 3 to 4B, the connecting member 33 according to the present exemplary embodiment includes the sinuous body 33a that is installed between the cap plate 20 and the first terminal plate 32.

In this case, the sinuous body 33a of the connecting member 33 may include a first connector 33a1, a second connector 33a2, a bent portion 33a3, and a through-hole 33a4 through which the first terminal 31 penetrates.

In addition, the sinuous body 33a of the connecting member 33 is installed between the terminal plate 32 and the cap plate 20 such that one side faces the terminal plate 32 while the other side faces the cap plate 20.

According to the present exemplary embodiment, the first connector 33a1 is formed at one side of the sinuous body 33a that faces the terminal plate 32, and the second connector 33a2 is formed at the other side of the sinuous body 33a that faces the cap plate 20.

Accordingly, the first connector 33a1 is installed to face the first terminal plate 32 such that it is electrically coupled to the first terminal plate 32.

The second connector 33a2 is installed to face the cap plate 20 such that it is electrically coupled to the cap plate 20.

The first and second connectors 33a1 and 33a2 may be coupled through the bent portion 33a3.

The bent portion 33a3 has a sinuous shape, and may be formed, for example, by bending a long thin plate or winding it in a coil-like shape.

The bent portion 33a2 may be covered with insulating coating layers 33a5 and 33a6.

The insulating coating layers 33a5 and 33a6 may include a first insulating coating layer 33a5 and a second insulating coating layer 33a6.

Specifically, the first insulating coating layer 33a5 is coated on a portion of one side of the sinuous body 33a facing the first terminal plate 32 where the first connector 33a1 is not positioned.

The second insulating coating layer 33a6 is coated on a portion of the other side of the sinuous body 33a facing the cap plate 20 where the second connector 33a2 is not positioned.

In one embodiment, the first terminal plate 32 is electrically insulated from the bent portion 33a3 by the first insulating coating layer 33a5, and the cap plate 20 is electrically insulated from the bent portion 33a3 by the second insulating coating layer 33a6.

Accordingly, based on the present exemplary embodiment, a current path formed by the first connector 33a1 for electrically coupling the first terminal 31 and the cap plate 20, the bent portion 33a3, and the second connector 33a2 may be formed in the connecting member 33.

Referring to FIG. 2, the first electrode 11 according to the present exemplary embodiment is located at an outer surface of the electrode assembly 10.

In one embodiment, since the first electrode 11 may be the negative electrode and the second electrode 12 may be the positive electrode, the case 26 that is electrically coupled to the second electrode 12 through the connecting member 33 may be positively charged.

The positively charged case 26 and the negatively charged first electrode 11 are located at opposite surfaces of the separator 13 with the separator 13 located therebetween.

Accordingly, when a conductive material 70 (e.g., a nail) penetrates the rechargeable battery 100, the conductive material 70 sequentially penetrates the case 26, the separator 13, and the first and second electrodes 11 and 12, thereby generating a short-circuit current between the first electrode 11 and the second electrode 12.

In this case, a short-circuit current path is formed between the first electrode 11 and the second electrode 12 to discharge the short-circuit current to the outside of the electrode assembly 10 by way of the conductive material 70, the cap plate 20 combined to the case 26, the connecting member 33, the first terminal plate 32, the first terminal 31, and the first current collecting member 50a.

Even if the short-circuit current path formed between the first electrode 11 and the second electrode 12 ceases to exist, the short-circuit current flowing between the first and second electrodes 11 and 12 remains inside the electrode assembly 10 as long as the first and second electrodes 11 and 12 are short-circuited by the conductive material 70.

Accordingly, in order to prevent ignition or explosion of the electrode assembly 10 due to the short-circuit current remaining inside the electrode assembly 10, the short-circuit current remaining inside the electrode assembly 10 may be minimized.

According to the present exemplary embodiment, the short-circuit current is effectively dissipated in the connecting member 33 that forms the short-circuit current path between the first and second electrodes 11 and 12, thereby minimizing the amount of the short-circuit current remaining inside of the electrode assembly 10.

Specifically, according to the present exemplary embodiment, the short-circuit current generated by the short-circuit of the first and second electrodes 11 and 12 may be discharged from the electrode assembly 10 through the short-circuit current path, and may be dissipated through the connecting member 33 that is installed between the first terminal plate 32 and the cap plate 20.

In other words, the short-circuit current passing through the short-circuit current path between the first and second electrodes 11 and 12 is discharged from the electrode assembly 10 to pass through the case 26, the cap plate 20, the second connector 33a2 electrically coupled to the cap plate 20, the sinuous bent portion 33a3, and the first connector 33a1 electrically coupled to the first terminal plate 32.

In this case, some of the short-circuit current passing through the short-circuit current path between the first and second electrodes 11 and 12 is dissipated while passing through the second connector 33a2 of the connecting member 33, the sinuous bent portion 33a3, and the first connector 33a1.

Figure 5:
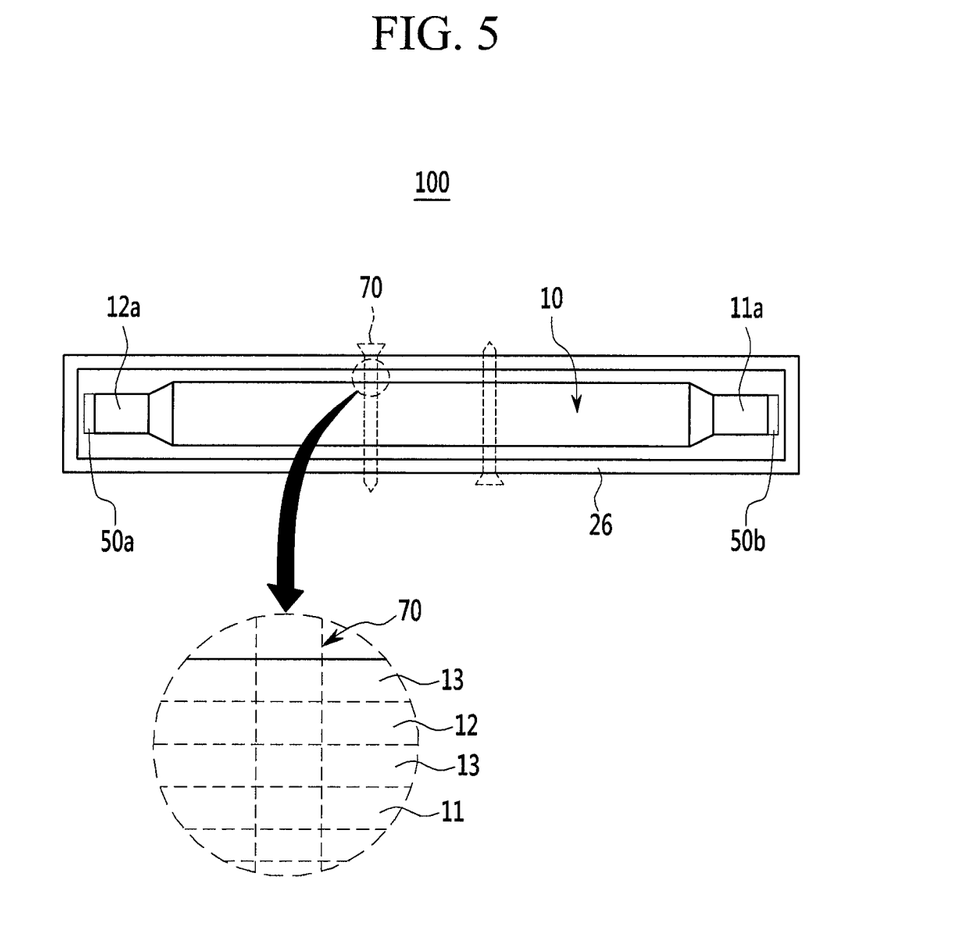
FIG. 5 is a cross-sectional view of FIG. 1 taken along the line V-V.

Among the short-circuit current passing through the short-circuit current path between the first and second electrodes 11 and 12, the amount of the short-circuit current passing through the fuse portion 51a of the first current collecting member 50a decreases in proportion to the amount of the short-circuit current that is dissipated in the connecting member 33.

Accordingly, based on the present exemplary embodiment, since the amount of the short-circuit current passing through the fuse portion 51a per unit time decreases due to the dissipation of the short-circuit current in the connecting member 33, a melting time of the fuse portion 51a may be delayed.

When the melting time of the fuse portion 51a is delayed as in the present exemplary embodiment, the short-circuit current path between the first and second electrodes 11 and 12 may continue to exist further for a melting delay time of the fuse portion 51a.

According to the present exemplary embodiment, since the short-circuit current generated by the short-circuit of the first and second electrodes 11 and 12 may be discharged outside of the electrode assembly 10 through the short-circuit current path for the melting delay time of the fuse portion 51a to be dissipated in the connecting member 33, the amount of the short-circuit current remaining inside the electrode assembly 10 after the fuse portion 51a is melted and then the short-circuit current path ceases to exist may be minimized.

As a result, according to the present exemplary embodiment, since the short-circuit current, which is generated by the short-circuit of the first and second electrodes 11 and 12 due to the penetration of the conductive material 70, can be sufficiently discharged outside of the electrode assembly 10 through the short-circuit current path for the melting delay time of the fuse portion 51a, the ignition or explosion of the electrode assembly 10 due to the short-circuit current remaining inside the electrode assembly 10 after the short-circuit current path ceases to exist can be prevented by the melting of the fuse portion 51a.

Figure 6:
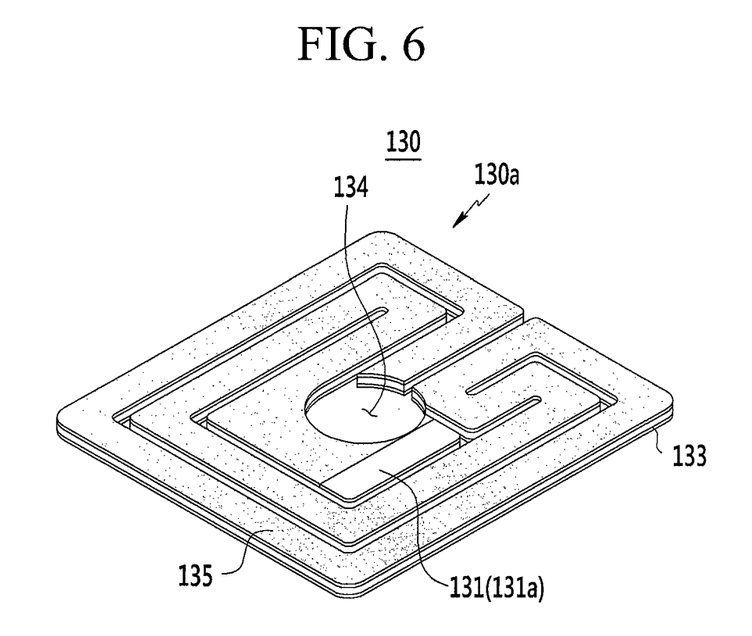
FIG. 6 is a perspective view of a connecting member according to a second exemplary embodiment of the present invention.
Figure 7:
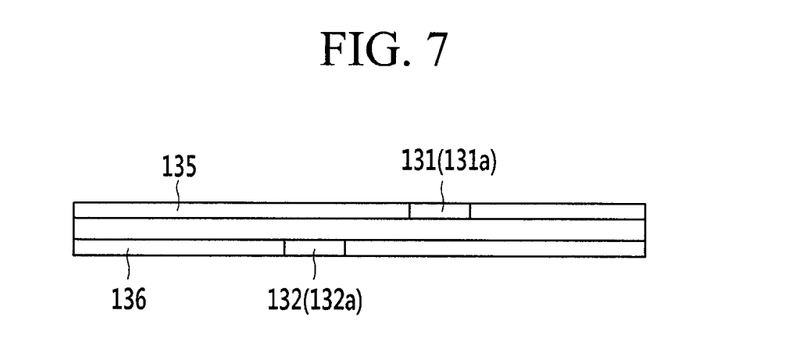
FIG. 7 is a front view of the connecting member of FIG. 6.

FIG. 6 is a perspective view of a connecting member according to a second exemplary embodiment of the present invention, and FIG. 7 is a front view of the connecting member of FIG. 6.

A connecting member 130 according to the present exemplary embodiment includes a sinuous body 130a that is installed between the cap plate 20 and the first terminal plate 32.

In this case, the sinuous body 130a of the connecting member 130 may include a first connector 131, a second connector 132, a bent portion 133, and a through-hole 134 through which the first terminal 31 penetrates.

The sinuous body 130a of the connecting member 130 is installed between the first terminal plate 32 and the cap plate 20 such that one side faces the first terminal plate 32 and the other side faces the cap plate 20.

According to the present exemplary embodiment, the first connector 131 is formed at one side of the sinuous body 130a that faces the first terminal plate 32, and the second connector 132 is formed at the other side of the sinuous body 130a that faces the cap plate 20.

In addition, the first connector 131 may include a first protrusion 131a that protrudes from the one side facing the first terminal plate 32, and the second connector 132 may include a second protrusion 132a that is located opposite to the one side to protrude from the other side facing the cap plate 20.

According to the present exemplary embodiment, the first protrusion 131a of the first connector 131 and the first terminal plate 32 may be installed to contact each other, and the second protrusion 132a of the second connector 132 and the cap plate 20 may be installed to contact each other.

The first and second connectors 131 and 132 may be coupled through the bent portion 133.

In this case, the bent portion 133 has a sinuous shape, and may be formed, for example, by bending a long thin plate or winding it in a coil-like shape.

Further, the bent portion 133 may be coated with insulating coating layers 135 and 136.

The insulating coating layers 135 and 136 may include a first insulating coating layer 135 and a second insulating coating layer 136.

Specifically, the first insulating coating layer 135 may be coated on a portion of one side of the sinuous body 130a facing the first terminal plate 32 where the first connector 131 is not positioned.

In this case, a thickness of first insulating coating layer 135 may be equal to or less than a height of the first protrusion 131a of the first connector 131.

The second insulating coating layer 136 may be coated on a portion of the other side of the sinuous body 130a facing the cap plate 20 where the second connector 132 is not positioned.

In this case, a thickness of the second insulating coating layer 136 may be equal to or less than a height of the second protrusion 132a of the second connector 132.

Thus, the first terminal plate 32 is electrically insulated from the bent portion 133 by the first insulating coating layer 135, and the cap plate 20 is electrically insulated from the bent portion 133 by the second insulating coating layer 136.

The first connector 131 is electrically coupled to the first terminal plate 32 through the first protrusion 131a, and the second connector 33a2 is electrically coupled to the cap plate 20 through the second protrusion 132a.

Accordingly, according to the present exemplary embodiment, the first terminal plate 32 and the cap plate 20 can be stably electrically coupled through the first and second protrusions 131a and 132a of the connecting member 130.

Figure 8:
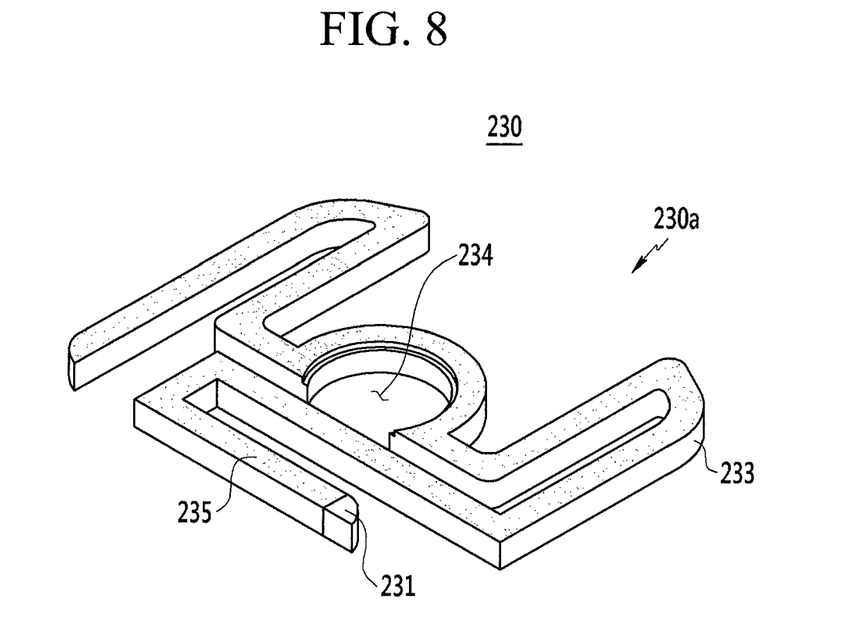
FIG. 8 is a perspective view of a connecting member according to a third exemplary embodiment of the present invention.
Figure 9:
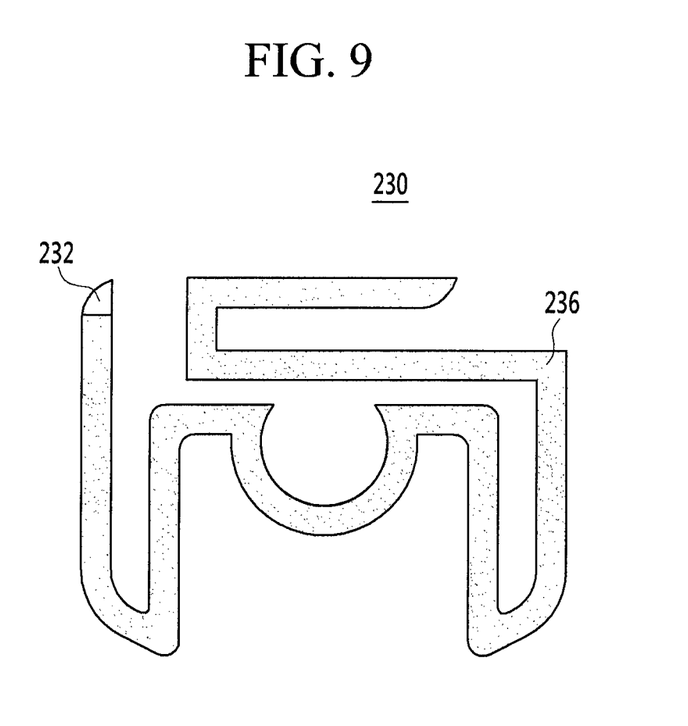
FIG. 9 is a bottom view of the connecting member of FIG. 8.

FIG. 8 is a perspective view of a connecting member according to a third exemplary embodiment of the present invention, and FIG. 9 is a bottom view of the connecting member of FIG. 8.

Referring to FIGS. 8 and 9, the connecting member 230 according to the present exemplary embodiment includes a sinuous body 230a that is installed between the cap plate 20 and the first terminal plate 32.

In this case, the sinuous body 230a of the connecting member 230 may include a first connector 231, a second connector 232, a bent portion 233, and a through-hole 234 through which the first terminal 31 penetrates.

The sinuous body 230a of the connecting member 230 is installed between the terminal plate 32 and the cap plate 20 such that one side faces the terminal plate 32 and the other side faces the cap plate 20.

According to the present exemplary embodiment, the first connector 231 is formed at one side of the sinuous body 230a that faces the terminal plate 32, and the second connector 232 is formed at the other side of the sinuous body 230a that faces the cap plate 20.

Thus, the first connector 231 is installed to face the first terminal plate 32 such that it is electrically coupled to the first terminal plate 32.

The second connector 232 is installed to face the cap plate 20 such that it is electrically coupled to the cap plate 20.

The first and second connectors 231 and 232 may be coupled through the bent portion 233.

In this case, the bent portion 233 has a sinuous shape, and may be formed, for example, by bending a long thin plate or winding it in a coil-like shape.

Further, the bent portion 233 may be coated with insulating coating layers 235 and 236.

The insulating coating layers 235 and 236 may include a first insulating coating layer 235 and a second insulating coating layer 236.

Specifically, the first insulating coating layer 235 is coated on a portion of one side of the sinuous body 230a facing the first terminal plate 32 where the first connector 231 is not positioned.

The second insulating coating layer 236 is coated on a portion of the other side of the sinuous body 230a facing the cap plate 20 where the second connector 232 is not positioned.

In this case, the first terminal plate 32 is electrically insulated from the bent portion 233 by the first insulating coating layer 235, and the cap plate 20 is electrically insulated from the bent portion 233 by the second insulating coating layer 236.

Accordingly, based on the present exemplary embodiment, a current path formed by the first connector 231 for electrically coupling the first terminal 32 and the cap plate 20, the bent portion 233, and the second connector 232 can be formed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| | |
|---|---|
| 100: rechargeable battery | 10: electrode assembly |
| 11: first electrode | 12: second electrode |
| 13: separator | 30, 230: first terminal portion |
| 31, 231: first terminal | 32: first terminal plate |
| 33, 130, 230: connecting member | 33a, 130a, 230a: sinuous body |
| 33a1, 131, 231: first connector | 33a2, 132, 232: second connector |
| 33a3, 133, 233: bent portion | 33a4, 134, 234: through-hole |
| 33a5, 135, 235: first insulating coating layer | |
| 33a6, 136, 236: second insulating coating layer | |
| 34: first gasket | 40: second terminal portion |
| 41: second terminal | 42: second terminal plate |
| 43: second terminal insulating member | 44: second gasket |
| 50: current collecting member | 50a: first current collecting member |
| 50b: second current collecting member | 60: lower insulating member |
| 60a: first lower insulating member | 60b: second lower insulating member |
| 70: conductive material | |

What is claimed is:

1. A rechargeable battery comprising:
a case;
an electrode assembly accommodated in the case;
a cap plate sealing the case;
terminals electrically coupled to the electrode assembly and penetrating the cap plate;
terminal plates on the cap plate, wherein each of the terminal plates extends in a first plane and is coupled to a respective one of the terminals; and
a connecting member including a planar sinuous body extending in a second plane parallel to the first plane and being located between the cap plate and a respective one of the terminal plates to electrically couple the cap plate and the terminal plate.

2. The rechargeable battery of claim 1, wherein the sinuous body includes a first connector that faces the terminal plate and is electrically coupled to the terminal plate, a second connector that faces the cap plate and is electrically coupled to the cap plate, and a bent portion that connects the first connector and the second connector.

3. The rechargeable battery of claim 2, wherein the bent portion of the sinuous body is covered with an insulating coating layer.

4. The rechargeable battery of claim 2, wherein the bent portion of the sinuous body is spiral-shaped.

5. The rechargeable battery of claim 2, wherein the first connector includes a first protrusion that protrudes from a first side facing the terminal plate, and the second connector includes a second protrusion that is located opposite to the first side to protrude from a second side facing the cap plate.

6. The rechargeable battery of claim 5, wherein the first side has a first insulating coating layer that is thinner than the first protrusion, and the second side is covered with a second insulating coating layer that is thinner than the second protrusion.

7. The rechargeable battery of claim 1, wherein the sinuous body of the connecting member includes a through-hole through which the terminal penetrates.

8. The rechargeable battery of claim 6, further comprising a current collecting member electrically coupling the terminal and the electrode assembly and including a fuse portion.

* * * * *